US012590027B2

(12) United States Patent
Robert et al.

(10) Patent No.:  US 12,590,027 B2
(45) Date of Patent:  Mar. 31, 2026

(54) METHOD FOR RECYCLING WATER RESULTING FROM A METHOD FOR PRODUCING A MAT OF MINERAL FIBRES

(71) Applicant: SAINT-GOBAIN ISOVER, Courbevoie (FR)

(72) Inventors: Antoine Robert, Paris (FR); Leslie Genieys, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 987 days.

(21) Appl. No.: 17/763,809

(22) PCT Filed: Sep. 24, 2020

(86) PCT No.: PCT/EP2020/076681
§ 371 (c)(1),
(2) Date: Mar. 25, 2022

(87) PCT Pub. No.: WO2021/058634
PCT Pub. Date: Apr. 1, 2021

(65) Prior Publication Data
US 2022/0348494 A1      Nov. 3, 2022

(30) Foreign Application Priority Data
Sep. 26, 2019    (FR) ..................................... 1910642

(51) Int. Cl.
*C03C 13/06*          (2006.01)
*C02F 1/00*           (2023.01)
              (Continued)

(52) U.S. Cl.
CPC .............. *C03C 13/06* (2013.01); *C02F 1/004* (2013.01); *C03C 25/16* (2013.01); *C03C 25/32* (2013.01);
              (Continued)

(58) Field of Classification Search
CPC ......... C03C 13/06; C03C 25/16; C03C 25/32; C03C 25/70; C03C 2218/111; C03C 2218/32; C02F 1/004; C02F 2103/34
              (Continued)

(56) References Cited

U.S. PATENT DOCUMENTS 3,356,565 A     12/1967  Smucker et al.
7,153,437 B2 *  12/2006  Luka ......................... C02F 1/66
                                                        210/749
              (Continued)

FOREIGN PATENT DOCUMENTS

EP        1509638 A1     3/2005
EP        3127956 A1     2/2017
              (Continued)

OTHER PUBLICATIONS

Machine translation of FR 2918365 A1. (Year: 2009).*
International Search Report issued Nov. 30, 2020 in PCT/EP2020/076681 (with English translation), 4 pages.

*Primary Examiner* — Coris Fung
*Assistant Examiner* — Catriona M Corallo
(74) *Attorney, Agent, or Firm* — Element IP, PLC

(57)                ABSTRACT

The invention relates to the field of materials based on mineral fibers, in particular mineral wool such as glass wool or rock wool. More specifically, the present invention relates to a method and a device for recycling the water recovered in a fiberizing and shaping method when using a specific acid binder based on monomeric polycarboxylic acid, or a salt of such an acid.

14 Claims, 1 Drawing Sheet

(51) Int. Cl.

| | |
|---|---|
| *C03C 25/16* | (2006.01) |
| *C03C 25/32* | (2018.01) |
| *C03C 25/70* | (2006.01) |
| *C02F 103/34* | (2006.01) |

(52) U.S. Cl.
CPC .......... *C03C 25/70* (2013.01); *C02F 2103/34* (2013.01); *C03C 2218/111* (2013.01); *C03C 2218/32* (2013.01)

(58) Field of Classification Search
USPC ...................................................... 106/162.1
See application file for complete search history.

(56) References Cited

U.S. PATENT DOCUMENTS

| | | | |
|---|---|---|---|
| 8,591,642 B2 * | 11/2013 | Hansen .................... | D04H 1/64 |
| | | | 106/217.6 |
| 2003/0221457 A1 | 12/2003 | Cline et al. | |

FOREIGN PATENT DOCUMENTS

| | | | |
|---|---|---|---|
| FR | 2918365 A1 | 1/2009 |
| WO | WO-2019025707 A1 | 2/2019 |

* cited by examiner

[Fig 1]
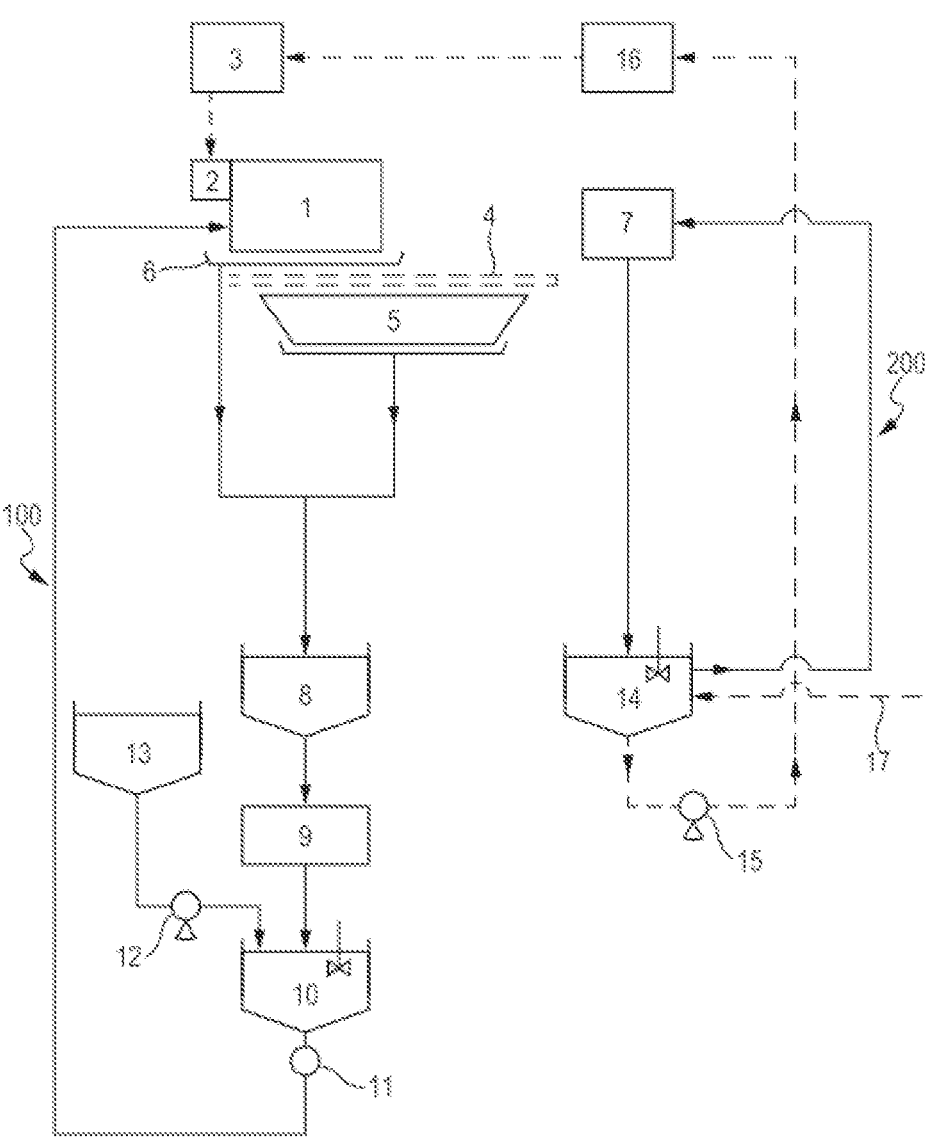

METHOD FOR RECYCLING WATER RESULTING FROM A METHOD FOR PRODUCING A MAT OF MINERAL FIBRES

TECHNICAL FIELD

The invention relates to the field of materials based on mineral fibers, in particular mineral wool such as glass wool or rock wool. More specifically, the present invention relates to a method and a device for recycling the water recovered in a fiberizing and shaping method when using a specific acid binder based on monomeric polycarboxylic acid, or a salt of such an acid.

TECHNICAL BACKGROUND

The majority of materials such as insulation boards or rolls currently on the market consist of a mineral wool mat or felt comprising mineral fibers, such as glass fibers, bound by an organic binder.

The various steps and devices required to manufacture insulation materials of this type are well known in the art. Typically, the formation of the mineral fiber mat comprises a fiberizing method by means of centrifugation, examples of which are described in EP 0406 107 or EP 0461 995.

More precisely, it is common practice for the formation of the aforementioned mats or felts to apply onto the neo-formed fibers, by spraying, an aqueous solution of a binder which, after curing, enables the fibers to be bound together. In such methods, the residual heat of the mineral fibers and the blast of hot air created by suitable means through the fiber mat, received on a conveyor after fiberizing, are sufficient to vaporise and remove the vast majority of the excess water contained in the initial binder composition. The mineral wool mat, freed of most of its moisture, is then sent to a cross-linking chamber, or oven, to complete the drying process and cure the binder. In a known way, this curing is carried out under conditions that ensure both the final mechanical strength of the mat obtained, as well as its flexibility, that is its ability to return to substantially its initial shape and thickness, after a stage of strong compression, which is particularly necessary for its packaging and transport.

For a long time, phenol-formaldehyde type resins have been used as binders to fulfil the above functions, due to their excellent cost/performance ratio and their relative ease of preparation and use. However, the tightening of regulatory constraints on volatile organic compounds has led to a shift away from these binders, in favour of binders based on polymers of carboxylic acids and polyols, commonly referred to as "acrylic binders."

The main problem with the use of such binders is the acidity of the binder solution sprayed onto the fibers in the fiberizing chamber. Thus, depending on the type of resin used, a pH of the solution generally lower than 4, or even more often lower than 3 or even 2.5, is necessary to obtain a mat with good usage properties. As a result, the water from the method, especially that recovered from the fiber conveyor belt after forming, is very acidic.

It is common practice in the field to recycle and use at least part of this recovered water, and preferably all of it, to manufacture the binder solution upstream of the fiberizing process and/or to clean the production equipment, in particular the forming line (fiberizing and formation of the fiber mat), as well as the fumes generated by the cooking stage of the method. Such a configuration has the particular advantage of greatly minimising the operating cost of the installation, by making the treatment of the waste water from the method unnecessary or by greatly minimising the quantities to be treated.

It is therefore conceivable that, in the context of such recycling, the marked acidity of the recovered water is a real problem because equipment such as pipes allowing recycling are subject to very strong corrosion. As a result, their lifespan becomes significantly limited.

One obvious solution is to use pipes made of a metal known for its corrosion resistance, such as stainless steel. However, such a solution entails a significant additional cost and does not guarantee sufficient efficiency over time, while posing problems for maintenance personnel in handling the liquids present in the circuit, particularly if that circuit needs to be purged or cleaned.

Other solutions have been proposed to extend the lifespan of these pipes, in particular the one presented in documents U.S. Pat. No. 7,153,437 and WO 2009/007648. This solution consists of incorporating a base into the recycling circuit of the wash water which is used for washing the components of the forming unit (including the forming chamber) and possibly for washing the fumes and gases from the oven and/or forming chamber.

Another method is proposed in document U.S. Pat. No. 7,754,020, which provides a first recycling loop for the wash water of the conveying, suction and ventilation means associated with the forming chamber, including means for adjusting the pH of this wash water, and a second recycling loop specifically for the water used to wash the walls of the forming chamber, on which the mineral fibers freshly coated with aqueous binder are adhered. In this second recycling loop, the wash water is not neutralised but simply filtered and reused in the manufacture of the binder.

While the above solutions are interesting in the case of acrylic binders, they cannot simply be transposed to other binders that have been developed more recently to counter the disadvantages of acrylic binders, in particular their high viscosity in the neutralised state and their negative impact on the environment. These new generation binders, called "green binders", are based on melanoidins obtained by the Maillard reaction (see WO2007/014236, WO2008/127936 and WO2009/019232) or are formed from thermoset polyesters obtained by reacting sugars with monomeric polycarboxylic acids, in particular citric acid, and are described in particular in patent applications WO 2013/014399 and WO 2013/021112.

The applicant has observed that the citric acid used as a reagent in the manufacture of these "green" binders has a tendency to decompose in the oven, the temperature of which is generally raised to more than 180° C. or even more than 200° C. The decomposition products formed, including citraconic acid, itaconic acid, propionic acid, acetic acid and formic acid, then evaporate via the oven flues. The oven fumes also contain undecomposed citric acid (see PCT/FR2019/050879 not yet published at the time of filing of this application) and are therefore highly acidic. The mixture of process wash water and oven fumes wash water can thus reach a pH of 4. In order to avoid corrosion of the equipment, which can reach 1 mm/year in some places, this wash water should be neutralised with a significant amount of base before it can be recycled to the forming area, in particular in accordance with WO 2009/007648. In this document, a portion of the recycled water is also directed to the binder solution preparation station. However, it has been observed that even a small amount of base affects the hardening of the binder and thus its ability to bind the mineral fibers together, as well as the mechanical properties of the fiber mat. One solution to this problem is to reacidify the fraction of the wash water intended for the manufacture of the binder. Another solution proposed in U.S. Pat. No. 7,754,020 is to separately recycle the wash water from the walls of the forming hood to the binder preparation station, without neutralising it. The sized fibers that adhere to the walls of the hood contain reagents that can be reused in the manufacture of the binder.

However, it was not obvious how this solution could be transposed to the fumes wash water of the oven and employed in a method using a binder based on carbohydrates and monomeric polycarboxylic acid such as citric acid. This fumes wash water contains various degradation products of the binder, distinct from the reagents used in its manufacture.

SUMMARY OF THE INVENTION

The applicant has now developed a method of reducing the corrosion of equipment in a method for producing a mineral fiber mat obtained using a monomeric polycarboxylic acid binder, such as citric acid. This method essentially consists of recycling the wash water from the oven fumes in a separate recycling loop from that used for washing the other equipment, in particular the forming chamber.

The applicant was surprised to find that this fumes wash water, which contains few binder reagents but is highly charged with acidic decomposition products, can be used for the manufacture of binder without needing to be neutralised. The reintroduction of the acidic decomposition products of the reagents into the binder does not significantly interfere with the curing reaction (cross-linking) of the binder or degrade the mechanical properties of the resulting insulation products.

The object of the invention is thus a method for reducing the corrosion of equipment in a method for producing a mineral fiber mat, said method comprising a step of fiberizing fibers and then bonding them with the aid of an aqueous binder in a forming zone, a step of cross-linking the binder in an oven, and washing the equipment in the forming zone by means of wash water that is continuously recycled in a first recycling loop, said method comprising adjusting the pH of the wash water to a value between 6 and 9 before the wash water is recycled to said forming zone along said first recycling loop, the production method further comprising washing the fumes from the oven and recycling the fumes wash water, said corrosion-reducing method being characterized in that the aqueous binder comprises at least one sugar selected from hydrogenated sugars, reducing sugars, and non-reducing sugars, and at least one monomeric polycarboxylic acid or salt thereof, in that the fumes wash water is recycled in a second recycling loop, separate from the first, a portion of this recycled fumes wash water being transferred at intervals to a zone for preparing said binder, without adjusting its pH.

The invention also relates to an installation for producing a fiber mat comprising:

a forming unit comprising means for spraying a solution of a binder onto neoformed fibers, supplied by a station for preparing the binder solution, and first washing means for washing the forming unit, means for receiving and conveying the fibers impregnated with the binder to an oven provided with one or more flues, means for sucking off the excess binder contained in the fiber mat received on the conveying means, and first collection means for collecting the wash water from the forming unit, the suction and collection means being in fluid communication with a first tank connected to a base supply means, said first tank being in fluid communication with said washing means for washing the forming unit, to form a first recycling circuit, second washing means for washing the fumes coming from the oven flue(s), and second collection means for collecting the wash water from those fumes, characterized in that the second collection means comprises a second tank, separate from the first tank, and in fluid communication with the second washing means to form a second recycling circuit, and in that said second tank is in fluid communication with the binder solution preparation station.

FIGURES

FIG. 1 represents a diagram of an installation used for the implementation of the method according to the invention.

DETAILED DESCRIPTION

The invention relates to a method of reducing corrosion of equipment in a method for producing a mineral fiber mat.

This method traditionally comprises a step of fiberizing fibers and then bonding them with an aqueous binder in a forming zone, followed by a step of cross-linking the binder in an oven provided with one or more flues, most often two flues, through which the hot gases escape from the oven.

According to the invention, the equipment in the forming area is washed by means of continuously recycled wash water in a first recycling loop. For this purpose, the water from the forming method is collected at least in part at the outlet of the forming area, in particular at the fiber conveyor belt. Advantageously, the recovered water is at least partly used for washing at least one of the constituent elements of the device for obtaining the fiber mat, in particular the walls of the forming chamber or hood, the fiber conveying means and/or the suction means used for removing the excess binder in the fiber mat. In this way, it is possible to recover, in particular, the reagents used to form the binder and which have not reacted, as well as the unbound mineral fibers. Some of the water recycled in the first loop is advantageously filtered through filters of about 50 μm, used to dilute the binder composition immediately before spraying the diluted composition onto the mineral fibers, by means of a spray ring.

However, the wash water circulating in this first recycling loop is not used to wash the fumes from the oven.

The method according to the invention further comprises adjusting the pH of the wash water to a value between 6 and 9, before the wash water is recycled to said forming zone along said first recycling loop. For this purpose, a base can be added to the recycled water by any means and in particular manually, automatically or semi-automatically. The base can thus be added automatically in the form of an aqueous solution to the first recycle loop by means of a dosing pump, depending on the pH measured by one or more pH probes arranged in the first recycle loop. Alternatively, the base flow rate can be adjusted directly as a function of the acid binder flow rate introduced during the forming method, in particular according to a proportional relationship. Generally speaking, the pH value is adjusted by means of a base chosen from alkaline bases of the alkali metal or alkaline earth metal hydroxide or carbonate type. The nature of the base used depends in particular on the target pH, whereby a relatively weak base such as lime, ammonia or potassium hydroxide can be used to achieve a pH of 6 to 7, whereas a stronger base, such as sodium hydroxide, is preferred to achieve a pH of 7 to 9.

The method according to the invention further comprises washing the fumes from the oven and recycling this fumes wash water in a second recycling loop, separate from the first. Part of this recycled fumes wash water is occasionally transferred to a preparation area for the said binder, without adjusting its pH. In order to compensate for the resulting loss of washing solution by volume, a quantity of water equivalent to the quantity of wash water transferred to the preparation zone of the said binder is introduced into the fumes wash water.

In a preferred embodiment of the invention, the recycled fumes wash water is filtered before being used for the preparation of the binder.

The method according to the invention is preferably implemented as part of a method for producing a mineral fiber mat using a particular binder. The binder used comprises precisely one sugar selected from hydrogenated sugars, reducing sugars, and non-reducing sugars, and at least one monomeric polycarboxylic acid or salt thereof.

The polycarboxylic acid used according to the invention is of monomeric type. In other words, this term does not cover polymers obtained by polymerisation of monomeric polycarboxylic acids, such as homopolymers or copolymers of acrylic acid or of methacrylic acid. It may be a dicarboxylic, tricarboxylic or tetracarboxylic acid.

Dicarboxylic acids encompass, for example, oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, particularly containing at least one boron or chlorine atom, tetrahydrophthalic acid and derivatives thereof, particularly containing at least one chlorine atom such as chlorendic acid, isophthalic acid, terephthalic acid, mesaconic acid and citraconic acid.

Tricarboxylic acids encompass, for example, citric acid, tricarballylic acid, 1,2,4-butanetricarboxylic acid, aconitic acid, hemimellitic acid, trimellitic acid, and trimesic acid.

Tetracarboxylic acids include 1,2,3,4-butanetetracarboxylic acid and pyromellitic acid.

Citric acid is preferred.

The polycarboxylic acid may be partially or fully neutralised with a base, for example an amine or ammonia. Preferably the polycarboxylic acid is used in acid form, that is not neutralised by a base.

To obtain a polyester, the polycarboxylic acid is reacted with at least one sugar.

A first type of sugar that can be used according to the invention is reducing sugars. This term refers to carbohydrates of the formula $C_n(H_2O)_p$ where p=n (monosaccharides) or p=n−1 (oligo- and polysaccharides) containing at least one aldehyde or ketone group (reducing group). The reducing sugar may be selected from: monosaccharides such as glucose, galactose, mannose, fructose and mixtures thereof, and disaccharides, such as lactose, maltose, isomaltose, cellobiose and mixtures thereof. Preferably glucose or fructose is used, preferentially glucose.

The hydrogenation products of these carbohydrates, in which the aldehyde or ketone group has been reduced to an alcohol, constitute a second type of sugar which can be used according to the invention, designated as "hydrogenated sugars". These hydrogenation products are also called alditols or sugar alcohols. They may be obtained by catalytic hydrogenation using known methods, working in conditions of high hydrogen pressure and high temperature, in the presence of a catalyst selected from elements of groups IB, IIB, IVB, VI, VII and VIII of the periodic table of the elements, preferably from the group comprising nickel, platinum, palladium, cobalt, molybdenum and mixtures thereof. The preferred catalyst is Raney nickel. Hydrogenated sugar is for example, selected from: erythritol, arabitol, xylitol, sorbitol, mannitol, iditol, maltitol, isomaltitol, lactitol, cellobitol, palatinitol, maltotritol and the hydrogenation products of starch hydrolysates or lignocellulosic materials and mixtures thereof.

Starch hydrolysates are products obtained by enzymatic and/or acid hydrolysis of starch. The degree of hydrolysis is generally characterized by dextrose equivalent (DE), defined by the following relationship:

$$DE = 100 \times \left( \frac{\text{number of glycoside bonds broken}}{\text{number of glycoside bonds in the initial starch}} \right)$$

The preferred starch hydrolysates, before the hydrogenation step, have a DE of between 5 and 99, and advantageously between 10 and 80.

Particularly preferably, use will be made of a hydrogenated sugar selected from the group consisting of maltitol, xylitol, sorbitol and the hydrogenation products of starch hydrolysates or lignocellulosic materials, particularly of hemicellulose, in particular of xylans and xyloglucans. Hydrogenated sugars can be advantageous if a light-coloured mineral fiber mat is desired, which is difficult to achieve with reducing sugars, which tend to become coloured by the Maillard reaction. Hydrogenated sugars also have a higher thermal stability than reducing sugars.

The invention further relates to non-reducing-sugar-based binders consisting of several carbohydrate units whose hemiacetal hydroxyl-carrying carbons are involved in the osidic bonds linking the units together. Examples of such non-reducing sugars are disaccharides such as trehalose, isotrehaloses, sucrose and isosucrose, and mixtures thereof, or trisaccharides such as melezitose, gentianose, raffinose, erlose and umbelliferose, or tetrasaccharides such as stachyose, or pentasaccharides such as verbascose. Sucrose is preferred for use in the present invention.

In any case, it is possible to use one or more sugars from any of the above categories, or even a mixture of sugars from at least two different categories, in order to obtain a compromise of properties.

The above-mentioned constituents are usually mixed in a binder composition. The term "binder composition" is used here to refer to aqueous solutions of varying concentrations of solids, which are sufficiently fluid to be pumpable, and which have a viscosity such that they can be sprayed through nozzles onto neoformed fibers, possibly after dilution with water.

The binder composition generally contains from 30 to 70% by weight, preferably from 40 to 60% by weight, of polycarboxylic acid, based on the dry matter content of the binder composition. Generally, the respective proportions of sugar and polycarboxylic acid are chosen so as to lead to binders which, in the crosslinked state, provide the final mineral wool product with the best mechanical properties, particularly after accelerated aging in humid conditions. They thus generally correspond to a sugar/polycarboxylic acid weight ratio of between 25/75 and 75/25, preferably between 40/60 and 60/40.

The binder composition may further comprise a catalyst that can be selected from Lewis bases and acids, such as clays, silica or colloidal silica, organic amines, quaternary ammoniums, metal oxides, metal sulfates, metal chlorides, urea sulfates, urea chlorides and silicate-based catalysts.

The catalyst can also be a compound containing phosphorus, for example an alkali metal hypophosphite, an alkali metal phosphite, an alkali metal polyphosphate, an alkali metal hydrogen phosphate, a phosphoric acid or an alkylphosphonic acid. Preferably, the alkali metal is sodium or potassium.

The catalyst can also be a compound containing fluorine and boron, for example tetrafluoroboric acid or a salt of said acid, notably an alkali metal tetrafluoroborate such as sodium or potassium, an alkaline-earth metal tetrafluoroborate such as calcium or magnesium, a zinc tetrafluoroborate and an ammonium tetrafluoroborate.

Preferably, the catalyst is sodium hypophosphite, sodium phosphite or a mixtures of these compounds.

The amount of catalyst introduced into the binder composition is generally at most 20% by weight, advantageously from 1 to 10% by weight, based on the total weight of sugar(s) and polycarboxylic acid(s).

The binder composition used according to the invention may further comprise conventional additives, such as urea, a reactive silicone and/or fillers.

Its pH is generally between 2.0 and 9.0, preferably between 2.2 and 7.0, in particular between 2.5 and 5.0.

The mineral fibers to which the binder composition is applied may in particular consist of glass or rock fibers, preferably glass fibers. These fibers are formed by centrifugal extrusion and then the binder composition is sprayed onto them. The sized fibers are then collected as a fiber layer which is partially dewatered during transport to an oven where the binder-coated fibers are heated to at least 140° C., typically at least 200° C., for example between 250 and 280° C., in order to crosslink the binder.

The invention further relates to a facility for carrying out the above described production method.

The diagram in the attached FIGURE is a schematic view of an installation according to the invention, comprising two separate recycling circuits.

As illustrated in this FIGURE, this installation comprises a forming unit 1 which includes a fiberizing chamber (not shown) conventionally used for fiberizing glass wool, for example, in which the fiberizing method by internal centrifugation developed by the Applicant, examples of which are described in EP 0 406 107 or EP 0 461 995, can be implemented. The fiberizing chamber itself is well known and generally comprises a hood surmounted by one or more centrifuges, each of which comprises a basket for receiving the molten glass and a plate-shaped part whose peripheral wall is provided with a large number of orifices. In operation, the molten glass, which is fed in a stream from a melting furnace and first collected in the centrifuge basket, escapes through the plate orifices in the form of a multitude of rotating filaments. The centrifuge is further surrounded by an annular burner which creates a high-velocity gas stream at a sufficiently high temperature at the periphery of the centrifuge wall to stretch the glass filaments into fibers. The forming unit also comprises a forming hood in which a binder composition is sprayed onto the fibers subjected to a stream of hot air by means of a spraying device 2 fed from the binder preparation station 3.

The bottom of the forming hood comprises means 6 for collecting the wash water from the hood, as well as a device for receiving the fibers comprising a conveyor 4 comprising an endless belt permeable to fluids, under which are arranged suction boxes 5 for the fluids contained in the neoformed mat, resulting from the forming process described above. The suction boxes are connected to a fan (not shown), for example, to keep the suction boxes under negative pressure. The fluids are gases such as air and fumes as well as an excess aqueous phase containing excess binder and fines and fibers. A mat of glass wool fibers intimately mixed with the binder is formed on the conveyor belt. The mat is conveyed by the conveyor belt to an oven 7, which usually consists of a closed chamber comprising a series of boxes or compartments supplied with hot air by burners and circulated by fans. For example, the oven 7 is traversed by two complementary transport and calibration conveyors.

While ensuring the passage of hot gases that promote the rapid setting of the binder, the conveyors compress the mat to the desired thickness. As an example, for a rolled felt, this is typically between 10 and 150 mm, the density of the glass wool layer being for example between 10 and 100 kg/m³.

Cooking in the oven induces the evaporation of the residual water in the form of fumes which are recovered and treated at the exit of the oven 7, as well as the cross-linking of the binder between the fibers of the mat.

The fiber mat can then be subjected to other well-known operations such as edge cutting, longitudinal and/or transverse cutting, surfacing etc., in various devices of known technology.

The characteristics of the system described so far are quite conventional. On the other hand, the system according to the invention is characterized by the presence of two distinct recycling circuits, which will now be described.

As illustrated in this FIGURE, the fluids (including water and excess binder reagents) and fines coming from the forming chamber and present in particular on the conveyor 4 are typically extracted by means of the collection means 6 and suction boxes 5 described above, before being sent to a well 8 from which they are pumped before being stored in a first tank 10, after passing over a filtration system 9 provided with filters of about 500 μm in size in order to eliminate the fibers. This first tank is equipped with a pH probe 11 which is connected to a processor (not shown) which analyses the pH value read and controls a neutralisation system consisting of a pump 12 allowing the introduction of a neutralisation solution stored in a tank 13. The neutralisation solution is, for example, a 30% aqueous soda or ammonia solution which is fed to the tank 10 as soon as the pH value falls below 7.5±0.3. Once the pH has returned to this value, the processor shuts down the pump 12. After adjusting its pH, the wash water stored in the first tank 10 is transferred to the forming unit 1, thus forming a first recycling circuit 100. The amount of wash water in the first recirculation circuit 100 may be about 100 m³.

In turn, the fumes of the oven 7 are washed, at the level of the oven stacks, with an aqueous solution stored in a second tank 14 and sprayed into the stacks by means of venturis (not shown). The fumes wash water is collected at the base of a vortex (not shown) and returned to the same tank 14, thus forming a second recycle circuit 200 whose total volume may be about 5 m³. In practice, it is preferable to clean the fumes from the oven using a spray system producing two opposing jets with a flow rate of approximately 2 L/m$^3$ of fumes, which, on meeting, form a curtain of water through which the fumes pass. From time to time, some of the fumes wash water from the oven is taken from the second tank 14 and transferred, by means of the pump 15 and after passing through a filtration system 16, equipped with filters of approximately 50 μm, to the binder solution preparation station 3 which supplies the spraying means 2 within the forming unit 1. The second tank 14 is then supplied with city water via the pipe 17 in order to compensate for the resulting volume loss.

The invention claimed is:

1. A method for reducing the corrosion of equipment during production of a mineral fiber mat, said method comprising:

fiberizing fibers and then bonding them with the aid of an aqueous binder comprising at least one sugar selected from hydrogenated sugars, reducing sugars, and non-reducing sugars, and at least one monomeric polycarboxylic acid or salt thereof in a forming zone;

cross-linking the aqueous binder in an oven; and washing the equipment in the forming zone with wash water that is continuously recycled in a first recycling loop and whose pH is adjusted to a value between 6 and 9 before being recycled to said forming zone along said first recycling loop, the method further comprising washing fumes from the oven with water and recycling the fumes' wash water;

in a second recycling loop, separate from the first, a portion of the recycled fumes' wash water being transferred at intervals to a zone for preparing said aqueous binder, without adjusting its pH.

2. The method according to claim 1, wherein the pH value is adjusted with a base selected from an alkali metal hydroxide, an alkali metal carbonate, an alkaline earth metal hydroxide, and an alkaline earth metal carbonate.

3. The method according to claim 1, wherein the aqueous binder comprises at least one hydrogenated sugar selected from: erythritol, arabitol, xylitol, sorbitol, mannitol, iditol, maltitol, isomaltitol, lactitol, cellobitol, palatinitol, maltotriol, hydrogenation products of starch hydrolysates, and hydrogenation products of lignocellulosic materials.

4. The method according to claim 1, wherein the aqueous binder comprises at least one reducing sugar selected from: a monosaccharide and a disaccharide.

5. The method according to claim 1, wherein the aqueous binder comprises at least one non-reducing sugar selected from: disaccharides, trisaccharides, tetrasaccharides and pentasaccharides.

6. The method according to claim 1, wherein the monomeric polycarboxylic acid is selected from dicarboxylic acids, tricarboxylic acids, and tetracarboxylic acids.

7. The method according to claim 1, wherein a quantity of water equivalent to the quantity of wash water transferred to the preparation zone of said aqueous binder is introduced at intervals into the fumes' wash water.

8. The method according to claim 1, wherein the recycled fumes' wash water is filtered before being used for the preparation of the aqueous binder.

9. The method according to claim 1, wherein the aqueous binder comprises at least one hydrogenated sugar selected from: xylitol, maltitol, sorbitol, hydrogenation products of starch hydrolysates, and hydrogenation products of lignocellulosic materials.

10. The method according to claim 1, wherein the aqueous binder comprises at least one reducing sugar selected from: glucose, galactose, mannose, and fructose.

11. The method according to claim 1, wherein the aqueous binder comprises at least one reducing sugar selected from: glucose and fructose.

12. The method according to claim 1, wherein the aqueous binder comprises at least one reducing sugar selected from: lactose, maltose, isomaltose, and cellobiose.

13. The method according to claim 1, wherein the aqueous binder comprises a non-reducing sugar, which is sucrose.

14. The method according to claim 1, wherein the monomeric polycarboxylic acid is citric acid.

\* \* \* \* \*